United States Patent [19]

McGinity

[11] 3,898,330
[45] Aug. 5, 1975

[54] CORTICOSTEROID PHOSPHATE SALTS/NEOMYCIN SULFATE OPHTHALMIC

[75] Inventor: James William McGinity, North Brunswick, N.J.

[73] Assignee: E. R. Squibb & Sons, Inc., Princeton, N.J.

[22] Filed: Aug. 1, 1973

[21] Appl. No.: 384,551

[52] U.S. Cl. ... 424/181; 260/239.55 D; 260/397.45
[51] Int. Cl.² ..................... A01N 9/00; A61K 31/71
[58] Field of Search................. 424/181; 260/397.45

[56] References Cited
UNITED STATES PATENTS

| | | | |
|---|---|---|---|
| 3,105,795 | 10/1963 | Nobile | 167/65 |
| 3,138,528 | 6/1964 | Marcus | 167/58 |
| 3,146,164 | 8/1964 | Macek et al. | 167/77 |
| 3,317,384 | 5/1967 | Underwood | 167/58 |

Primary Examiner—Elbert L. Roberts
Attorney, Agent, or Firm—Lawrence S. Levinson; Merle J. Smith; Donald J. Barrack

[57] ABSTRACT

Ophthalmic solutions comprising a corticosteroid phosphate salt and neomycin sulfate are formulated using phosphate ions to overcome the incompatability of the anionic steroid salt and the cationic antibiotic.

10 Claims, No Drawings

CORTICOSTEROID PHOSPHATE SALTS/NEOMYCIN SULFATE OPHTHALMIC

BACKGROUND OF THE INVENTION

Neomycin sulfate, a basic antibiotic that is used in ophthalmic solutions, ionizes in water to give positively charged ions. Corticosteroid phosphate salts ionize in water to give negatively charged ions. While it is highly desirable to incorporate the cationic antibiotic and the anionic steroid salt in a single ophthalmic formulation, problems arise due to the basic incompatability between the two materials, which results in the formation of a precipitate.

The prior art recognizes that the steroid salts themselves have a stability problem when they are used in the form of an aqueous solution. U.S. Pat. No. 2,970,944 to Charnicki et al. states that "Although aqueous solutions of steroid phosphate salts are colorless and free from insoluble matter when freshly made, these solutions, upon standing at room temperature or at elevated temperatures, begin to deteroirate. The deterioration is evidenced by the formation of a precipitate and by the development of a yellow color." Charnicki et al. teach that the stability problem can be overcome by the use of a small amount of a nitrogen containing compound such as niacinamide, creatinine, or derivatives thereof. To prevent decomposition due to oxidative degradation Charnicki et al. teach the use of an antioxidant such as sodium sulfite, sodium bisulfite, sodium hypophosphite, sodium citrate, penicillamine, pyridinesulfinic acid, thiourea, or sodium formaldehyde sulfoxylate.

Marcus et al., in U.S. Pat. No. 3,138,528, also deal with the problem of the stability of aqueous solutions of steroids such as triamcinolone acetonide dipotassium phosphate. To solve the problem Marcus et al. teach the use of a water-soluble saccharin. As antioxidants, Marcus et al. teach the use of alkali metal sulfites, alkali metal bisulfites, alkali metal hypophosphites, alkali metal citrates, thioglycol, pyridinesulfinic acid, thiourea and sodium formaldehyde sulfoxylate. The use of buffering agents such as sodium citrate, disodium and monosodium phosphate, and sodium acetate is also taught by the reference. Neomycin can also be present in the compositions of Marcus et al.

Solutions containing both a corticosteroid phosphate and neomycin sulfate have been previously prepared. To overcome the incompatability between the anionic steroid salt and the cationic antibiotic, sodium bisulfite has been used. However, the clarity of a sodium bisulfite stabilized solution is not maintained if the solution is brought in contact with oxygen. Solutions of the above-described compositions (i.e., those containing sodium bisulfite as a compatability agent) remain clear when stored in glass ampuls, but crystallization occurs in an unacceptably short period of time if the solution is in contact with oxygen.

BRIEF DESCRIPTION OF THE INVENTION

It is an object of this invention to formulate a corticosteroid phosphate salt and neomycin sulfate in a clear aqueous ophthalmic solution.

It is an object of this invention to formulate a corticosteroid phosphate salt and neomycin sulfate in an aqueous ophthalmic solution that remains clear when contacted with oxygen.

It is an object of this invention to formulate a corticosteroid phosphate salt and neomycin sulfate in an aqueous ophthalmic solution that remains clear when packaged in a plastic container.

It has been found that the above-outlined objectives can be achieved by the inclusion of a dibasic monovalent phosphate salt in an ophthalmic formulation comprising an aqueous solution of a corticosteroid phosphate salt and neomycin sulfate.

DETAILED DESCRIPTION OF THE INVENTION

The ophthalmic formulations of this invention comprise a corticosteroid phosphate salt and neomycin sulfate as active ingredients. The weight ratio of corticosteroid base to neomycin base can range from 4:1 to 1:4, preferably 5:3 to 3:5.

Corticosteroid phosphate salts are well known. Triamcinolone acetonide dipotassium phosphate, tetrahydrotriamcinolone acetonide dipotassium phosphate, dexamethasone sodium phosphate, and prednisolone sodium phosphate are exemplary.

It has been found that the incompatability of a corticosteroid phosphate salt and neomycin sulfate in aqueous solution can be overcome by the addition of a dibasic monovalent phosphate salt. Dibasic sodium phosphate ($Na_2HPO_4$) and dibasic potassium phosphate ($K_2HPO_4$) are exemplary; dibasic sodium phosphate is preferred.

As an alternative to the addition of a dibasic monovalent phosphate salt, per se, to overcome the incompatability between anionic steroid and cationic antibiotic, it is also possible to add compounds that will react in situ (in the aqueous solution) to form the dibasic monovalent phosphate salt. The in situ salt formation could be accomplished, in the case of dibasic sodium phosphate, by the use of sodium phosphate ($Na_3PO_4$) and phosphoric acid ($H_3PO_4$).

The stoichiometry of the neomycin-steroid complex which results from the incompatability of the two materials is about 1:3 (neomycin:steroid). It has been found that the level of dibasic monovalent phosphate salt required to provide clear neomycin-steroid solutions in accordance with this invention is dependent on the concentration of neomycin sulfate and not on the concentration of corticosteroid phosphate salt.

The weight ratio of dibasic monovalent phosphate salt to neomycin sulfate can range from about 8:5 to about 8:1, preferably 2:1 to 3:1.

In preparing the solutions of this invention it is important when using low concentrations of phosphate to mix the dibasic monovalent phosphate salt with either the neomycin sulfate or the corticosteroid phosphate salt before bringing the two active ingredients in contact with each other. This procedure is necessitated by the fact that although a low concentration of dibasic monovalent phosphate salt prevents formation of a precipitate, it has little effect on a preformed precipitate. With larger concentrations of phosphate this problem is not present.

Ophthalmic solutions should have a pH of from about 6.0 to 8.5, preferably 6.5 to 7.5. It is contemplated as part of this invention that buffers may be used as needed to achieve the desired pH. Additionally, antioxidants, preservatives, and the like may be added to the compositions of this invention.

It is also contemplated as a feature of this invention that additional antibiotics, e.g., Polymixin B sulfate, may be used along with neomycin sulfate in the compositions of this invention.

The following examples are specific embodiments of the invention.

In the examples, the following procedure is used to prepare the formulations. The neomycin sulfate is added to 60% of the purified water and dissolved. The dibasic monovalent phosphate salt is dissolved in 15% of the water and then added to the neomycin sulfate solution. The corticosteroid phosphate salt and the other remaining additives are dissolved in 15% of the water and slowly added with stirring to the neomycin sulfate buffered solution. The solution is then adjusted to volume.

Example 1

| | Concentration mg./ml. |
|---|---|
| Neomycin sulfate | 3.26 |
| Tetrahydrotriamcinolone acetonide dipotassium phosphate | 3.40 |
| Dibasic sodium phosphate | 6.00 |
| Polyvinyl pyrrolidone | 8.00 |
| Sodium formaldehyde sulfoxylate | 2.00 |
| Thimerosal [(o-carboxyphenyl)thio]-ethylmercury sodium salt | 0.02 |
| Sorbitol 70% w/v | 0.01 ml |
| Distilled water q.s. | 1.0 ml |

Example 2

| | Concentration mg./ml. |
|---|---|
| Neomycin sulfate | 3.26 |
| Tetrahydrotriamcinolone acetonide dipotassium phosphate | 3.40 |
| Dibasic sodium phosphate | 6.00 |
| Distilled water q.s. | 1.0 ml |

Example 3

| | Concentration mg/ml |
|---|---|
| Tetrahydrotriamcinolone acetonide dipotassium phosphate | 3.4 |
| Neomycin sulfate | 2.5 |
| Polymixin B sulfate | 0.5 |
| Na$_2$HPO$_4$ | 7.5 |
| H$_3$PO$_4$ solution | q.s.(pH 6.0–6.5) |
| Sodium formaldehyde sulfoxylate | 3.0 |
| Thimerosal[(o-carboxyphenyl)thio]-ethylmercury sodium salt | 0.02 |
| Sorbitol 70% w/v | 0.01 ml |
| Water q.s. | 1 ml |

Example 4

| | Concentration mg./ml. |
|---|---|
| Neomycin sulfate | 3.26 |
| Dexamethasone sodium phosphate | 3.60 |
| Dibasic sodium phosphate | 6.00 |
| Distilled water q.s. | 1.0 ml |

Example 5

| | Concentration mg./ml. |
|---|---|
| Neomycin sulfate | 3.26 |
| Prednisolone sodium phosphate | 4.50 |
| Dibasic sodium phosphate | 6.00 |
| Distilled water q.s. | 1.0 ml |

Example 6

| | Concentration mg./ml. |
|---|---|
| Neomycin sulfate | 2.5 |
| Dibasic sodium phosphate | 4.75 |
| Tetrahydrotriamcinolone acetonide dipotassium phosphate | 3.40 |
| Sodium formaldehyde sulfoxylate | 3.00 |
| Thimerosal [(o-carboxyphenyl)-thio] ethylmercury sodium salt | 0.02 |
| Water q.s. | 1.0 ml |

What is claimed is:

1. A pharmaceutical formulation comprising in aqueous solution a corticosteroid phosphate salt, neomycin sulfate, and a dibasic monovalent phosphate salt, wherein the weight ratio of corticosteroid base to neomycin base is from about 4:1 to 1:4 and wherein the weight ratio of dibasic monovalent phosphate salt to neomycin sulfate is from about 8:5 to 8:1.

2. A pharmaceutical formulation in accordance with claim 1 wherein the weight ratio of corticosteroid base to neomycin base is from about 5:3 to 3:5.

3. A pharmaceutical formulation in accordance with claim 1 wherein the weight ratio of dibasic monovalent phosphate salt to neomycin sulfate is from about 2:1 to 3:1.

4. A pharmaceutical formulation in accordance with claim 1 wherein the corticosteroid phosphate salt is selected from the group consisting of triamcinolone acetonide dipotassium phosphate, tetrahydrotriamcinolone acetonide dipotassium phosphate, dexamethasone sodium phosphate, and prednisolone sodium phosphate.

5. A pharmaceutical formulation in accordance with claim 4 wherein the corticosteroid phosphate salt is tetrahydrotriamcinolone acetonide dipotassium phosphate.

6. A pharmaceutical formulation in accordance with claim 1 wherein the dibasic monovalent phosphate salt is dibasic sodium phosphate.

7. A pharmaceutical formulation in accordance with claim 1 having a pH of from about 6.0 to 8.5.

8. A method for providing a clear aqueous solution of a corticosteroid phosphate salt and neomycin sulfate which comprises incorporating a dibasic monovalent phosphate salt in the solution, wherein the weight ratio of corticosteroid base to neomycin base is from about 4:1 to 1:4 and wherein the weight ratio of dibasic monovalent phosphate salt to neomycin sulfate is from about 8:5 to 8:1.

9. A method in accordance with claim 8 wherein the dibasic monovalent phosphate salt is formed in situ.

10. A method in accordance with claim 8 wherein the dibasic monovalent phosphate salt is dibasic sodium phosphate.

* * * * *

UNITED STATES PATENT AND TRADEMARK OFFICE
CERTIFICATE OF CORRECTION

PATENT NO. : 3,898,330
DATED : August 5, 1975
INVENTOR(S) : James William McGinity It is certified that error appears in the above-identified patent and that said Letters Patent are hereby corrected as shown below:

In the title of the patent, the word "SOLUTION" should be added at the end.

Column I, line 2, the word "solution" should be added at the end of the title.

Signed and Sealed this sixteenth Day of December 1975

[SEAL]

Attest:

RUTH C. MASON
Attesting Officer

C. MARSHALL DANN
Commissioner of Patents and Trademarks